(12) United States Patent
Ishikawa

(10) Patent No.: US 7,937,002 B2
(45) Date of Patent: May 3, 2011

(54) ORIGINAL DOCUMENT READING APPARATUS

(75) Inventor: Satoshi Ishikawa, Fukushima (JP)

(73) Assignee: Oki Data Corporation, Tokyo (JP)

( * ) Notice: Subject to any disclaimer, the term of this patent is extended or adjusted under 35 U.S.C. 154(b) by 1283 days.

(21) Appl. No.: 11/178,366

(22) Filed: Jul. 12, 2005

(65) Prior Publication Data

US 2006/0012837 A1    Jan. 19, 2006

(30) Foreign Application Priority Data

Jul. 15, 2004 (JP) ................. 2004-208318

(51) Int. Cl.
*G03G 15/00* (2006.01)

(52) U.S. Cl. ................. 399/19; 399/9; 399/21; 399/368

(58) Field of Classification Search .......... 399/9, 16–22, 399/361, 363, 365, 367–374; *G03G 15/00*
See application file for complete search history.

(56) References Cited

U.S. PATENT DOCUMENTS

| | | | | |
|---|---|---|---|---|
| 4,917,371 A | * | 4/1990 | Bastow et al. | 271/245 |
| 5,074,690 A | * | 12/1991 | Del Signore et al. | 400/322 |
| 5,543,893 A | * | 8/1996 | Sheldon et al. | 399/18 |
| 6,236,450 B1 | * | 5/2001 | Ogura | 355/407 |
| 6,449,440 B1 | * | 9/2002 | Sawada | 399/19 |

FOREIGN PATENT DOCUMENTS

| | | | | |
|---|---|---|---|---|
| JP | 57117436 A | * | 7/1982 | |
| JP | 62098473 A | * | 5/1987 | |
| JP | 01296267 A | * | 11/1989 | |
| JP | 04016454 A | * | 1/1992 | |
| JP | 05-18168 | | 3/1993 | |
| JP | 05233177 A | * | 9/1993 | |
| JP | 06247641 A | * | 9/1994 | |
| JP | 08-143219 | | 6/1996 | |
| JP | 09114205 A | * | 5/1997 | |
| JP | 10-274867 | | 10/1998 | |
| JP | 2000-050005 | | 2/2000 | |
| JP | 2001136338 A | * | 5/2001 | |
| JP | 2004-080548 | | 3/2004 | |
| JP | 2005-277532 | | 10/2005 | |

OTHER PUBLICATIONS

Machine Translation of JP 2001136338 A.*

* cited by examiner

*Primary Examiner* — Judy Nguyen
*Assistant Examiner* — 'Wyn' Q Ha
(74) *Attorney, Agent, or Firm* — Rabin & Berdo, PC

(57) ABSTRACT

A document reading apparatus has a controller for conveying original documents from a section for loading documents via a section for reading documents to a section on which the documents are stacked, and controlling an operation of reading the documents. The apparatus includes respective sections for reporting apparatus information, detecting a start instruction when reading a document, and counting sheets conveyed to the reading section. If the reading operation is suspended in the event of an error, the controller instructs the reporting section, when resuming the reading operation, to report the loading on the loading section of documents, including already-read documents, the controller subsequently controls conveyance of documents when the detecting section detects the start instruction, to set the conveyance speed of the already-read documents faster than the conveyance speed of subsequent documents on which the reading operation was suspended, based on the number of sheets counted until the suspension.

12 Claims, 15 Drawing Sheets

CONTINUE READING JOB?
YES(START)    NO(CANCEL)

FIG. 8

READING JOB
CANCELED

FIG. 9

RELOAD ALL ORIGINAL DOCUMENTS
AND PUSH START KEY.

FIG. 10

NUMBER OF ORIGINAL DOCUMENTS ERROR
JOB IS CANCELED

FIG. 13

PAPER FEEDING SPPED [Fast]

YES(ENTER)    NO(SELECT)

FIG. 14

PAPER FEEDING SPEED [Normal]

YES (ENTER)    NO(SELECT)

ORIGINAL DOCUMENT READING APPARATUS

BACKGROUND OF THE INVENTION

1. Field of the Invention

This invention relates to an original document reading apparatus.

2. Description of Related Art

In a conventional original document reading apparatus such as, e.g., a scanning apparatus or an image forming apparatus such as, e.g., a copying machine, a printer, a facsimile machine, and a multi function product having functions of those apparatuses, medium conveyance is resumed after removing jammed original document and a cause of the jamming problem where original document jamming occurs during original document conveyance (see, e.g., Japanese Patent Laid-Open Publication No. H05-18,168).

With such a conventional original document reading apparatus as described above, however, an operator has to set only the yet unread original documents when resuming the medium conveyance after removing the cause of the jamming problem, but easily confuses the unread original documents with the original document already read, thereby raising problems such as duplicated reading of the already read original documents or failure of reading of the unread original documents.

It is an object of this invention to solve the above described problems with the conventional original document reading apparatus and to provide such an original document reading apparatus capable of reducing time loss on an operator without skipping reading of unread documents or reading already read documents, in which reading operation is skipped on sheets as many sheets as the original ducuirnents already read and is made to the remaining original documents when resuming the reading operation to the original documents after removing the jammed original documents in case that paper jamming occurs to stop the reading operation during original document conveyance operation.

SUMMARY OF THE INVENTION

To achieve the above, an original document reading apparatus according to this invention, having a controller for conveying an original document from a medium loading section for loading the original document via an information reading section for reading information on the original document to a discharged medium stacking section on which the original document is stacked, and for controlling reading of the information on the original document, comprises an apparatus information reporting section for reporting apparatus information, a reading start detecting section for detecting an original document reading start instruction when reading the original document, and a conveyance sheet number counting section for counting a sheet number of the original documents conveyed to the information reading section, wherein the controller instructs the apparatus information reporting section, when resuming the reading of the information on the original document after suspending the reading on an irregular occasion, to make a report of loading the original documents including the original documents on which the information is already read before suspending the reading, on the medium loading section, and subsequently controls conveyance of the original document when the reading start detecting section detects the original document reading start instruction, in a manner to set conveyance speed of the original documents on which the information is already read to faster than conveyance speed of the subsequent original documents on which the reading is suspended, based on the sheet number of the original documents counted with the conveyance sheet number counting section until suspending the reading.

According to this invention, the original document reading apparatus has a read sheet number counting section for counting the sheet number of the original documents which the information reading section could read, and the controller instructs the apparatus information reporting section, when resuming the reading of the information on the original document after suspending the reading on an irregular occasion, to make the report of loading the original documents including the original documents on which the information is already read before suspending the reading, on the medium loading section, and subsequently controls the conveyance of the original documents in such a manner as to skip the reading of the original documents based on the sheet number of the original documents counted with the conveyance sheet number counting section before suspending the reading, on the condition that the conveyance speed at the time of skipping the reading of the document is set to faster than the conveyance speed at the time of reading the documents.

In that case, where resuming the reading of the original documents on which the reading is suspended in the event of paper jamming at the time of conveying the original document, the reading is skipped on the original documents as many as the sheets of the already read original documents while made to the rest of the original documents, thereby preventing an operator from reading the already read original documents or skipping the reading of the unread document to reduce his time loss.

BRIEF DESCRIPTION OF THE DRAWINGS

This invention may take physical form in certain parts and arrangements of parts, a preferred embodiment and method of which will be described in detail in this specification and illustrated in the accompanying drawings which form a part hereof, and wherein;

FIG. 8 is a second view showing an example of the operational guidance displayed on the display device of the operation panel according to the first embodiment of this invention;

FIG. 9 is a third view showing an example of the operational guidance displayed on the display device of the operation panel according to the first embodiment of this invention;

FIG. 10 is a fourth view showing an example of the operational guidance displayed on the display device of the operation panel according to the first embodiment of this invention;

FIG. 13 is a first view showing an example of operational guidance displayed on a display device of an operation panel according to the second embodiment of this invention;

FIG. 14 is a second view showing an example of the operational guidance displayed on the display device of the operation panel according to the second embodiment of this invention;

DETAILED DESCRIPTION OF PREFERRED EMBODIMENTS OF THE INVENTION

Hereinafter, embodiments of this invention will be described in detail in reference to drawings.

Figure 1:
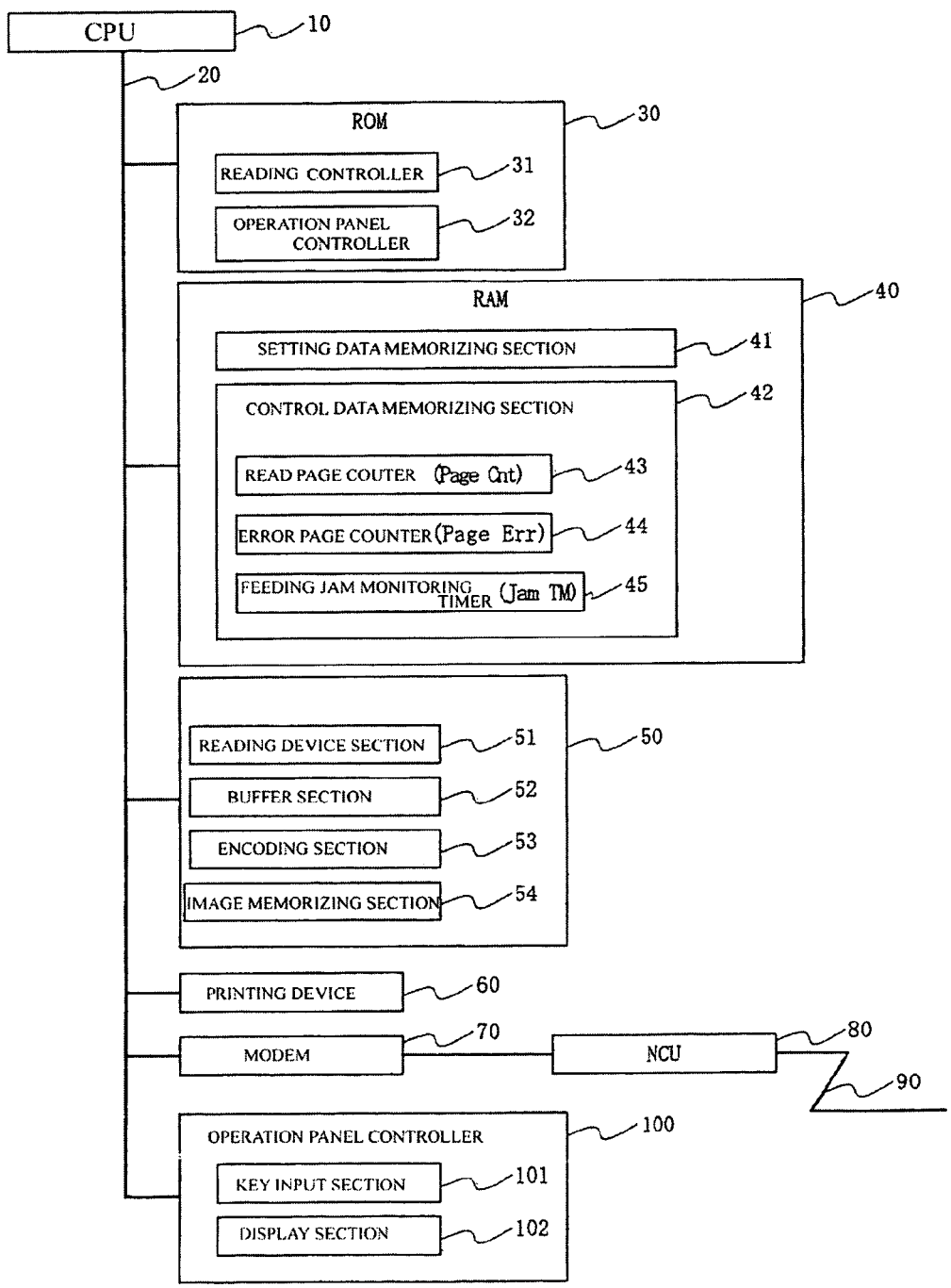
FIG. 1 is a view showing a structure of an original document reading apparatus according to the first embodiment of this invention.

FIG. 1 is a view showing a structure of an original document reading apparatus according to the first embodiment of this invention.

An original document reading apparatus according to this invention may be of any types such as, e.g., a scanning machine, a facsimile machine, a copying machine, or the like, as long as defined as an original reading apparatus having an automatic feeder, however, a multi function product combined with functions of the scanning apparatus, the facsimile apparatus, the printer apparatus, and the copying machine, is explained herein as the original document reading apparatus.

In FIG. 1, numeral 10 is a CPU (Central Processing Unit) defined as a computing means for controlling operation of the original document reading apparatus. Numeral 30 is a ROM (Read Only Memory) defined as a permanent memory for memorizing previously a program defined as a software executed with the CPU 10 and has a reading controller 31 for controlling a reading device section 51 described hereafter as well as an operation panel controller 32 for controlling a control panel controller 100 as described hereafter. It is to be noted that each of the reading controller 31 and the operation panel controller 31 is a program section.

Numeral 50 is a reading controller defined as a controller, and has the reading device section 51, a buffer section 52, an encoding section 53, and an image memorizing section 54. The reading device section 51 is defined as a scanning device with use of a reading sensor such as, e.g., a LED (Light Emitting Diode), a CCD (Charge Coupled Device), or the like, and reads and converts the original document into a dot image data. Furthermore, the reading device section 51 is composed of a mechanical part described hereafter, and defined as a program section for controlling reading or discharging operation such as made upon detecting existence of the original document with the sensor and upon driving or suspending a feed roller, reading skipping operation for conveying the original document without reading, or conveyance speed. The buffer section 52 is defined as a memorizing section for temporarily storing only a certain amount of information on the image read with the reading device section 51. It is to be noted that the buffer section 52 does not store the image information since only conveyance operation without making reading operation is made during the reading skipping operation on the original documents. Furthermore, the encoding section 53 is defined as a program section for reading the information on the image from the buffer section 52 and compressedly encoding the read information. Furthermore, the image memorizing section 54 is defined as an image information memorizing device of large capacity, having a DRAM (Dynamic Random Access Memory), a hard disk, or the like, while being defined as a memorizing device for storing sequentially the information on the image compressedly encoded with the encoding section 53.

The operation panel controller 100 has a key input section 101 and a display section 102. The key input section 101 is defined as a program section for analyzing the information input with keys such as, e.g., a function key, a cursor key, a start key, a dial key, or the like, necessary for the operator to operate the apparatus, and includes a reading start detecting section for detecting, when an original document reading start instruction is input with, e.g., the start key or the like, the instruction. The display section 102 is defined as a program section for displaying the operational guidance for the operator on a display device defined as an apparatus information reporting section, such as, e.g., an LCD (Liquid Crystal Display) or a CRT (Cathode Ray Tube) display of the key panel controller 100, in accordance with the key information input with the key input section 101.

Numeral 40 is defined as a RAM serving as a memorizing device for memorizing data generated when the CPU 10 executes the program, and has a setting data memorizing section 41 and a control data memorizing section 42 both defined as a memorizing section. Herein, the setting data memorizing section 41 memorizes the setting data selectable by the operator. The control data memorizing section 42 has a read page counter (Page Cnt) 43 defined as a read sheet number counting section for memorizing a page number of the original documents on which the reading operation is completed, an error page counter (Page Err) 44, for memorizing which page of the original documents is jammed, and a feeding jam monitoring timer (Jam TM) 45 for monitoring an original document feeding jam at the time of controlling the original document conveyance.

Numeral 60 is a printing device defined as a printer device such as, e.g., a thermal recording type, an electrophotographic type, or the like, and outputs the image data such as read with the reading device section 51, or received by a facsimile communication, as a hardcopy.

A modem 70 modulates and demodulates procedure data or the image data with a facsimile transmission controlling procedure and exchanges the data with external facsimile machines. An NCU (Network Control Unit) 80 is defined as a network controller, and controls connection or opening between the modem 70 and a line 90. The line 90 is defined as a switched network such as, e.g., a public telephone network, a local telephone network, or the like.

The CPU 10, the ROM 30, the RAM 40, the reading controller 50, the printing device 60, the modem 70, the NCU 80, and the operation panel controller 100 are connected in a communicable manner to one another by a system bus 20, and execute a software besides controlling a hardware.

A mechanical part of the original document reading apparatus according to this embodiment is described next.

Figure 2:
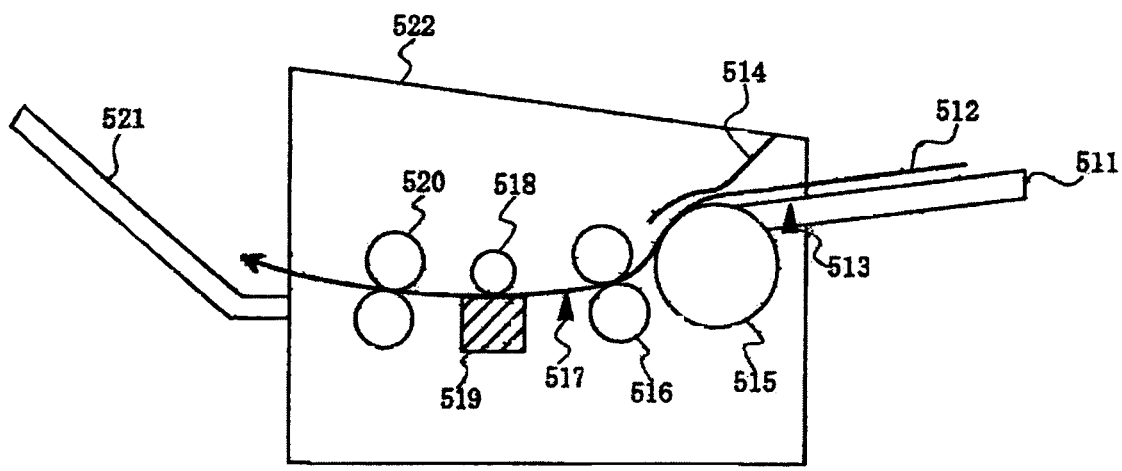
FIG. 2 is a view showing a structure of a mechanical part of the original document reading apparatus according to the first embodiment of this invention.

FIG. 2 is a view showing a structure of the mechanical part of the original document reading apparatus according to the first embodiment of this invention.

In FIG. 2, numeral 522 is defined as a reading unit while an original document tray 511 defined as a medium loading section is stacked with an original document 512 as an object sent by facsimile or copied by a copying machine. An original document sensor 513 serving as a medium detecting section for detecting existence of the original document is disposed on a downstream side in an original document conveyance direction on the original document tray 511.

Furthermore, an original document separator 514, an ADF (Auto Document Feeder), a roller 515, and a discharge sensor 517 defined as a medium discharge detecting section are disposed at an original document delivering system. A glass surface of a closely contact sensor 519 serving as an information reading section is disposed with an S (Send) roller 518 for preventing the original document from floating on a reading surface as well as for lowering a friction coefficient on a roller surface. The original document 512 is nipped between a first feed roller 516 and a second feed roller 520 disposed in front and in the rear of the closely contact sensor 519, thereby conveyed and discharged into the discharge tray 521 serving as a discharged medium stacking section.

Operation of the original document reading device thus structured is described next.

Figure 3:
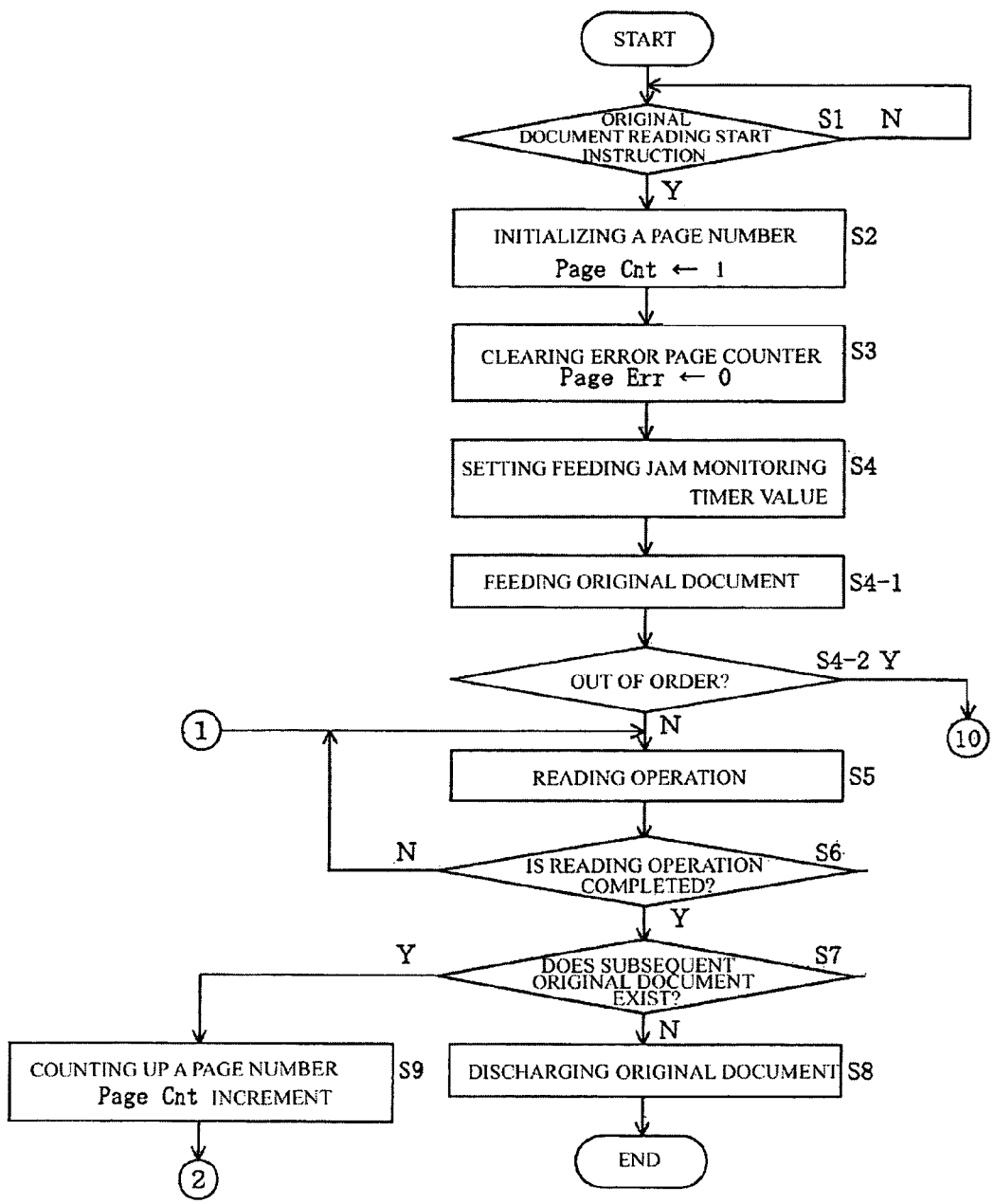
FIG. 3 is a first flow chart showing operation of an original document conveyance processing according to the first embodiment of this invention.
Figure 4:
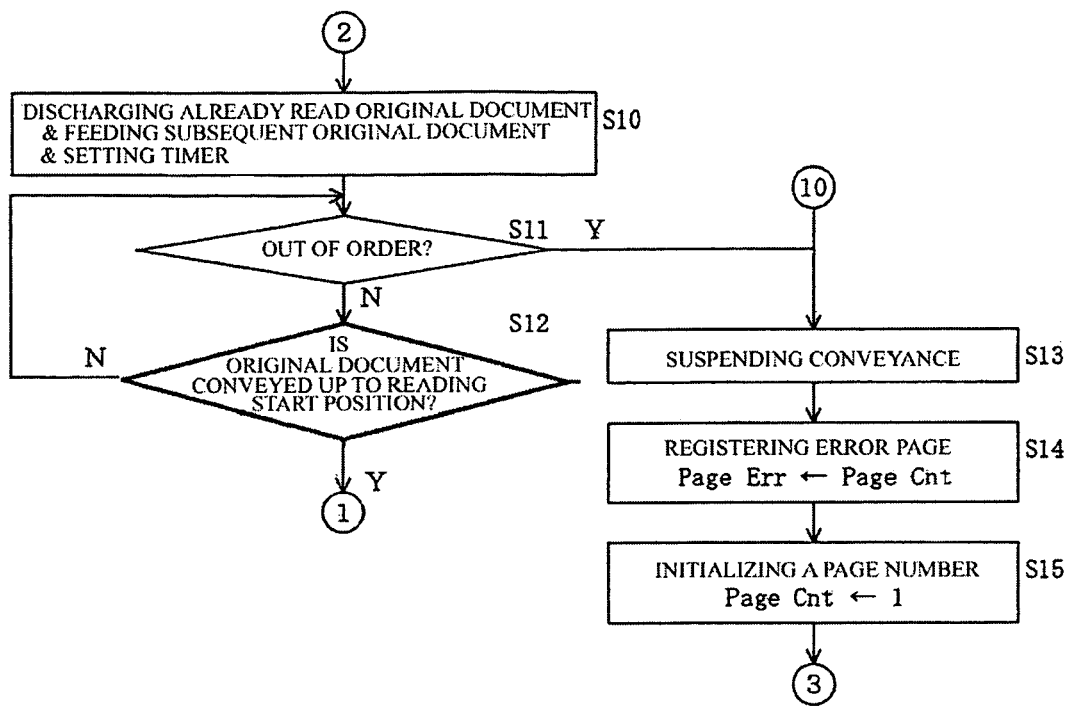
FIG. 4 is a second flow chart showing operation of the original document conveyance processing according to the first embodiment of this invention.
Figure 5:
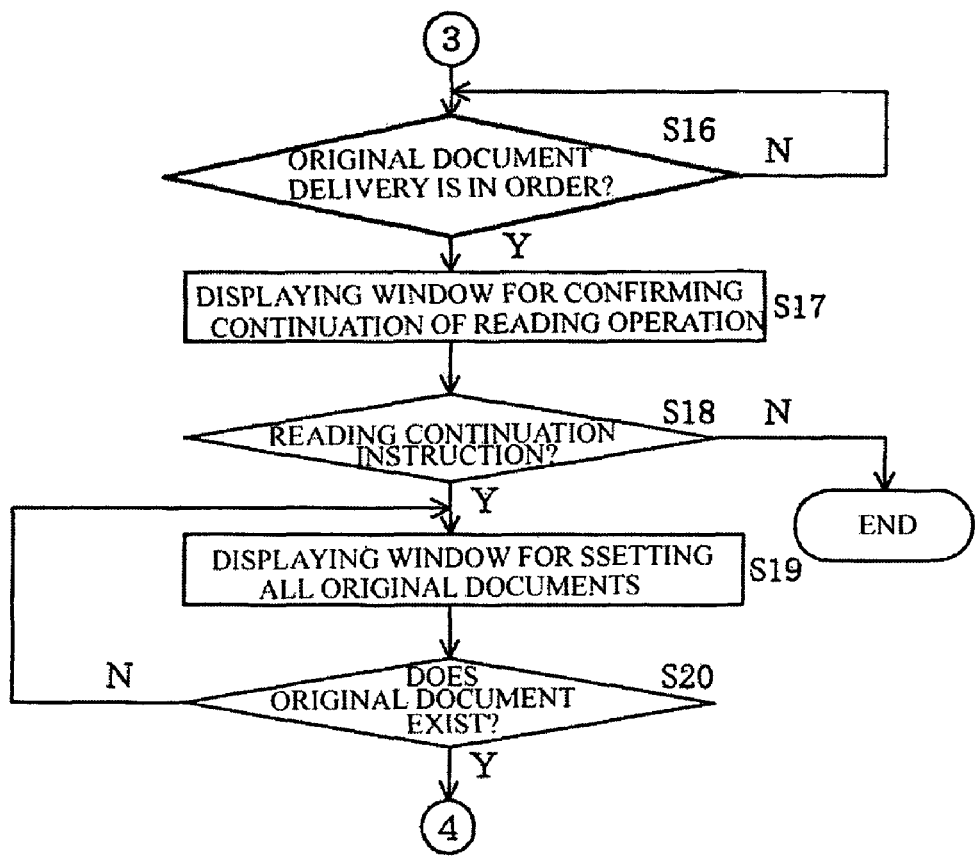
FIG. 5 is a third flow chart showing operation of the original document conveyance processing according to the first embodiment of this invention.
Figures 6, 7:
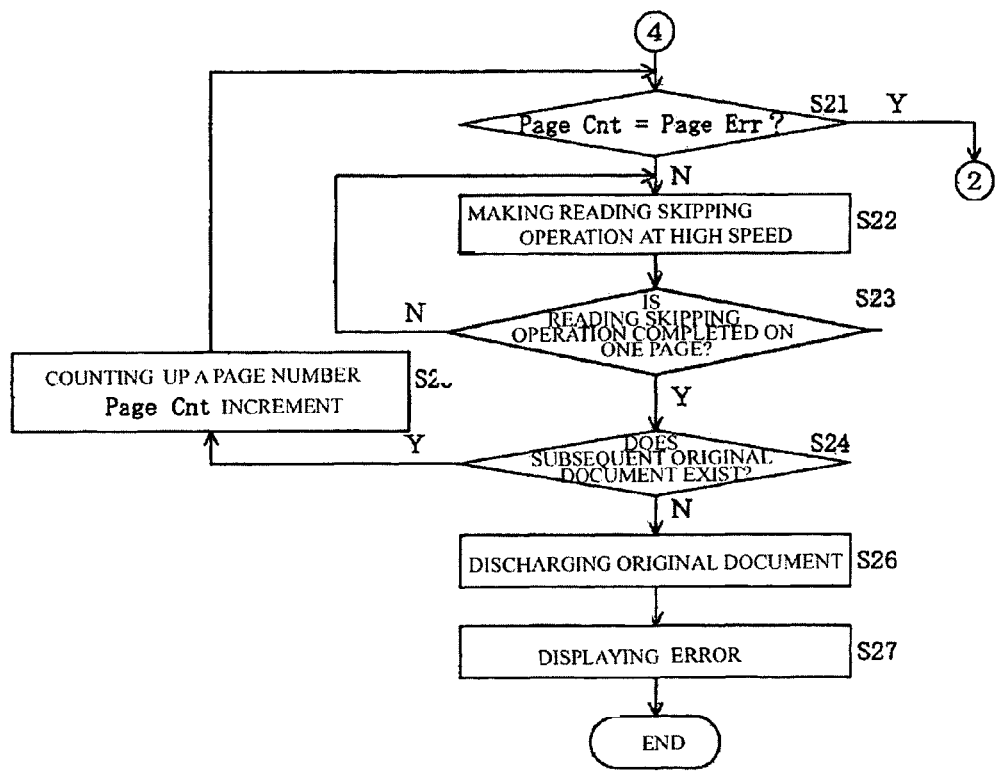
FIG. 6 is a fourth flow chart showing operation of the original document conveyance processing according to the first embodiment of this invention.
FIG. 7 is a first view showing an example of operational guidance displayed on a display device of an operation panel according to the first embodiment of this invention.

FIG. 3 is a first flow chart showing operation of an original document conveyance processing according to the first embodiment of this invention, and FIG. 4 is a second flow chart showing operation of the original document conveyance processing according to the first embodiment of this invention, and FIG. 5 is a third flow chart showing operation of the original document conveyance processing according to the first embodiment of this invention, and FIG. 6 is a fourth flow chart showing operation of the original document conveyance processing according to the first embodiment of this invention, and FIG. 7 is a first view showing an example of operational guidance displayed on a display device of an operation panel according to the first embodiment of this invention, and FIG. 8 is a second view showing an example of the operational guidance displayed on the display device of the operation panel according to the first embodiment of this invention, and FIG. 9 is a third view showing an example of the operational guidance displayed on the display device of the operation panel according to the first embodiment of this invention, and FIG. 10 is a fourth view showing an example of the operational guidance displayed on the display device of the operation panel according to the first embodiment of this invention.

Herein, operation of an original document conveyance processing with the CPU 10 is described. It is to be noted that the original document 512 in a readable state is to be previously inserted in the original document tray 511 of the reading device section 51, so that the operation subsequent to reception of the reading start instruction from the operator, is described.

The judgment is first made as to whether the original document reading start instruction is received. In this case, the judgment as to the original document reading start instruction is made according to whether the operator pushes a predetermined switch of the operation panel. It is to be noted that the CPU 10 is on standby until receiving the original document reading start instruction. Subsequently, when receiving the original document reading start instruction, the CPU 10 implements a skipping sheet number initialization such as required for a reading control processing and sets the reading counter 43 to one. That is, the CPU 10 sets a value in the page counter 43 to one. That is, the Page Cnt, is set to one. Next, the CPU 10 sets a value in the error page counter 44 to zero upon an error page counter clearing processing. That is, the Page Err is set to zero. The CPU 10 subsequently sets a timer value to the feeding jam monitoring timer 45 upon a feeding jam monitoring timer value setting processing.

The reading operation is subsequently made. In this case, the closely contact sensor 519 is lighted up, and the original document 512 conveyed with the first feed roller 516 as well as the second feed roller 520 is detected with the closely contact sensor 519 for each line, thereby being stored as the image information in the buffer section 52.

The judgment is subsequently made as to the reading operation is completed. In this case, the CPU 10 continues the reading operation until making the judgment that reading operation is completed to the original document 512 of one sheet, upon detecting, according to a signal change of the discharge sensor 517, the status that the rearmost end of the original document 512 is conveyed through the discharge sensor 517. When making the judgment that reading operation is completed to the original document 512 of one sheet, the judgment is further made as to whether the original document 512 to be subsequently read exists, that is, whether there is the subsequent original document. In this case, the judgment is made with the original document sensor 513, as to whether the original document 512 to be subsequently read exists. Where the judgment is then made that the original document 512 to be subsequently read does not exist on the original document tray 511, the original document presently conveyed is discharged and this processing is completed. In this case, the original document 512 is completed to be discharged upon keeping the first feed roller 520 driven for a certain period, and this reading job is then completed.

The judgment is made as to whether the subsequent original document exists. Where the judgment is made that the original document 512 to be read furthermore exists on the original document tray 511, the page number is counted up, thereby incrementing the read page counter 43. That is, the Page Cnt increment is implemented.

Subsequently, the already read original document is discharged while the subsequent original document is fed. In this case, the ADF roller 515 as well as the first feed roller 516 are driven, and the original documents are drawn with the original document separator 514, into the conveyance route one sheet by one sheet in order from the topmost original document. At the same time, the operation of discharging the already read original documents is implemented in parallel with the operation of conveying the subsequent original documents.

The judgment is then made as to whether the status is in error. In this case, the judgment as to the existence of the feeding jam is made with the feeding jam monitoring timer 45 for monitoring the original document feeding jam. That is, the feeding jam is confirmed in a case where the original documents 512 can not be detected with the discharge sensor 517 even when conveyed for a certain period or of a certain amount after starting the timer at the time of starting the feeding operation with the ADF roller 515. Furthermore, where the judgment is made that the status is not in error, the further judgment is made as to whether the original document 512 is conveyed to reach the reading start position. In this case, the original document 512 presently conveyed is detected with the reading start position sensor as the discharge sensor 517, and subsequently kept on being conveyed to reach a position of the closely contact sensor 519.

Furthermore, where the judgment is made that the status is in error, the conveyance is suspended. In this case, the conveyance of the original document 512 is immediately stopped ascribable to the error as the feeding jam.

The error page is subsequently registered. In this case, a value in the read page counter 43 is transferred into the error page counter 44 to memorize which page of the original documents is jammed. That is, the Page Cnt is transferred into the Page Err.

The sheet number is subsequently initialized, and a value in the read page counter 43 is set to one as an initial value. That is, the Page Cnt is set to one. In this case, the reading data on the jammed page or on the page which could not be read to the end are deleted. Furthermore, the data on the page which could not be read are saved.

The judgment is then made as to whether the error on the original document delivery is removed. In this case, the judgment is made as to whether the jammed original document in the reading device section 51 is removed after the original document gets jammed. That is, the judgment is made as to whether the original document sensor 513 detects nonexistence of the original document. The status on standby for the removal is continued until removing the jammed original document. It is to be noted that the judgment as to the removal may be made according to detection of a reading resume switch pushed by the operator, not the detection with the sensor.

Where the judgment is made that the jammed original document is removed, a window for confirming reading continuation is displayed. In this case, as shown in FIG. 7, a window for making a choice as to whether this reading job, i.e., operation of reading the original document, such as, e.g., copying or faxing operation, is to be continued or cancelled, is displayed as an operational guidance on the display device of the operation panel controller 100.

The judgment is subsequently made as to whether the reading continuation is instructed. In this case, the judgment as to whether this reading job is continued or cancelled is made based on the information input by the operator with the key of the operation panel controller 100 in accordance with the operational guidance. Where the judgment of job cancellation is made, a window such as shown in FIG. 8, for execution of the job cancellation is displayed as the operational guidance on the display device of the operation panel controller 100, and the image data stored in the image memorizing section 54 until when suspending the reading operation in the event of the jam are all deleted to complete this reading job, thereby making this processing over.

Furthermore, where the judgment is made that the job is continued, upon the judgment as to whether the reading continuation is instructed, a window for setting all the original documents is displayed. In this case, a window such as shown in FIG. 9, for urging the operator to reload all the original documents including the original documents already read before the reading operation is suspended due to the jammed original document, is displayed as the operational guidance on the display device of the operation panel controller 100. At this instant, the image data stored in the image memorizing section 54 by the time of suspending the reading operation in the event of the jam are all held.

The judgment is subsequently made as to whether the original document exists. In this case, the judgment is made with the original document sensor 513 as to whether the original documents 512 are reloaded.

Subsequently, the judgment is made as to whether the Page Cnt is equal to the Page Err. In this case, what is judged is the page on which the reading operation is suspended due to the jammed original document. That is, the judgment is made that the reading skipping operation is made to the original documents until when the jammed page is fed and then the reading skipping operation is switched into the reading operation on the original documents subsequent to the jammed page, according to the operator's reloading of the all the original documents including the already read original documents. It is to be noted that a window for indicating "under reading skipping operation" is displayed on the display device of the operation panel controller 100 during the page reading skipping operation.

Where the judgment is made that the jammed page is fed, i.e., that the pages to be skipped are over, the already read original documents are discharged while the subsequent original documents are fed to be conveyed, as a preparation for the reading operation, up to the reading position.

Furthermore, where the judgment is made that the jammed page is not yet fed, i.e., that the reading skipping operation is still implementable, the reading skipping operation is made at high speed. In this case, the conveyance operation of the original document 512 is simply made without making the image information reading operation with the closely contact sensor 519. In a case where the high resolution is designated for the reading operation, reading speed is regularly rendered slow, however, the original documents 512 are conveyed for the reading skipping operation at the maximum conveyance speed of the reading device section 51 without relation to the setting such as, e.g., resolution or density, at the time of the reading operation. This conveyance speed is faster than that at the time of the regular reading operation. It is to be noted that the original document 512 hardly gets jammed where separated from the S roller 518.

The judgment is made as to whether the reading skipping operation is completed to one page. In this case, the rearmost end of the original document 512 is detected being conveyed through the discharge sensor 517, and accordingly the reading skipping operation is continued until making the judgment that the reading skipping operation is completed to one sheet of the original documents 512. Where the judgment is made that the reading skipping operation is completed to one sheet of the original documents 512, the judgment is made as to whether the subsequent original document exists. In this case, the judgment is made with the original document sensor 513 as to the existence of the subsequent original document on the original document tray 511.

Where the judgment is made that the subsequent original document exists on the original document tray 511, a skipping page number is counted up, and the judgment is made as to whether the Page Cnt is equal to the Page Err.

The judgment is further made as to whether the subsequent original document exists, and where the judgment is made that the subsequent original document does not exist on the original document tray 511, the presently conveyed original document is discharged. In this case, discharge of the original document 512 is completed upon keeping the first feed roller 520 driven for a certain period.

An error indication is displayed and this processing is completed. In this case, supposedly, subsequent original documents do not run out during the reading skipping operation, so that the error indication, such as shown in FIG. 10, is displayed on the display device of the operation panel controller 100, while the image data stored in the image memorizing section 54 until when the reading operation is suspended in the event of the jam, are all canceled, and this reading job is cancelled and completed.

A flow chart is described next. The judgment is made at the step S1 as to whether the original document reading instruction is received. Where the original document reading instruction is received, the operation goes to the step S2 while where the original document reading instruction is not received, the operation is on standby. The initial value is set to one but may be set to zero. The skipping sheet number initialization such as required for the reading control processing is implemented and the Page Cnt is set to one at the step S2. At the step S3, the error page counter is cleared, that is, the Page Err is set to zero. A timer value is set to the feeding jam monitoring timer 45 at the step S4. The feeding operation is made at the step S4-1. The judgment is made at the step S4-2 as to whether the status is in error. Where the judgment is made that the status is not in error, the operation goes to the step S5 while where the judgment is made that the status is in error, the operation goes to the step S13. The reading operation is made at the step S5. The judgment is made at the step S6 as to whether the reading operation is completed. Where the reading operation is completed, the operation goes to the step S7 while where the reading operation is not yet completed, the operation returns to the step S5. Herein also, the jam may be monitored upon setting a different timer. The judgment is made at the step S7 as to whether the subsequent original document exists. Where the subsequent original document does not exist, the operation goes to the step S8 while the subsequent original document exists, the operation goes to the step S9. The original document is discharged and this processing is completed at the step S8. The page number is counted up and the Page Cnt increment is implemented at the step S9. The already read original document is discharged, and the subsequent original document is fed, and the timer is set at the step S10. The judgment is made at the step S11 as to whether the status is in error. Where the status is not in error, the operation goes to the step S12 while where the status is in error, the operation goes to the step S13. The judgment is made at the step S12 as to whether the original document is conveyed to reach the reading start position. Where the original document is conveyed to reach the reading start position, the operation returns to the step S5 while where the original document is not yet conveyed to reach the reading start position, the operation returns to the step S11. The conveyance operation is suspended at the step S13. The error page is registered and the Page Cnt is transferred into the Page Err at the step S14. The page number is initialized and the Page Cnt is set to one at the step S15. The judgment is made at the step S16 as to whether the error on the original document delivery is removed. Where the error on the original document delivery is removed, the operation goes to the step S17 while where the error on the original document delivery is not removed, the operation is on standby. The window for confirming the reading continuation is displayed at the step S17. The judgment is made at the step S18 as to whether the reading continuation is instructed. Where the reading continuation is instructed, the operation goes to the step S19 while the reading continuation is not instructed, this processing is completed. The window for setting all the original documents is displayed at the step S19. The judgment is made at the step S20 as to whether the original document exists. Where the original document exists, the operation goes to the step S21 while where the original document does not exist, the operation returns to the step S19. The judgment is made at the step S21 as to whether the Page Cnt is equal to the Page Err. Where the Page Cnt is equal to the Page Err, the operation returns to the step S10 while where the Page Cnt is not equal to the Page Err, the operation goes to the step S22. The reading skipping operation is made at high speed at the step S22. The judgment is made at the step S23 as to whether the reading skipping operation is completed to one page. Where the reading skipping operation is completed to one page, the operation goes to the step S 24 while where the reading skipping operation is not yet completed to one page, the operation returns to the step S22. Herein also, the jam may be monitored upon setting another different timer. The judgment is made at the step S24 as to whether the subsequent original document exists. Where the subsequent original document exists, the operation goes to the step S25 while where the subsequent original document does not exist, the operation goes to the step S26. The page number is counted up and the Page Cnt is incremented at the step S25. The original document is discharged at the step S26. The error indication is displayed and this processing is completed at the step S27.

As described above, according to this embodiment, where the original document gets jammed when conveyed, all the original documents including the already read original documents are reloaded on the original document tray 511 to be reconveyed. In this case, the error page counter 44 memorizes which page gets jammed, that is, the sheet number of the already read original documents. Therefore, when reconveying the original documents, the reading skipping operation is made, that is, conveyance operation is made without making the reading operation, to the original documents as much as the sheet number of the already read original documents, while only the rest of original documents are read. The unread documents can be therefore prevented from skipped.

Furthermore, when resuming the reading operation suspended in the event of the jam on the original document, the original documents are conveyed until the suspended original document is fed, on a condition the original document conveyance speed in the reading skipping operation is rendered to be the maximum conveyance speed of the reading device section 51, without relation to the setting such as, e.g., resolution or density at the time of the previous reading operation. Therefore, it becomes possible to reduce the operator's time loss in the original document reading operation.

The second embodiment is explained next. It is to be noted that members structured the same as the first embodiment are assigned with the same numerals to omit the duplicated explanation. The duplicated explanation for the same operation and effects as the first embodiment is also omitted.

Figure 11:
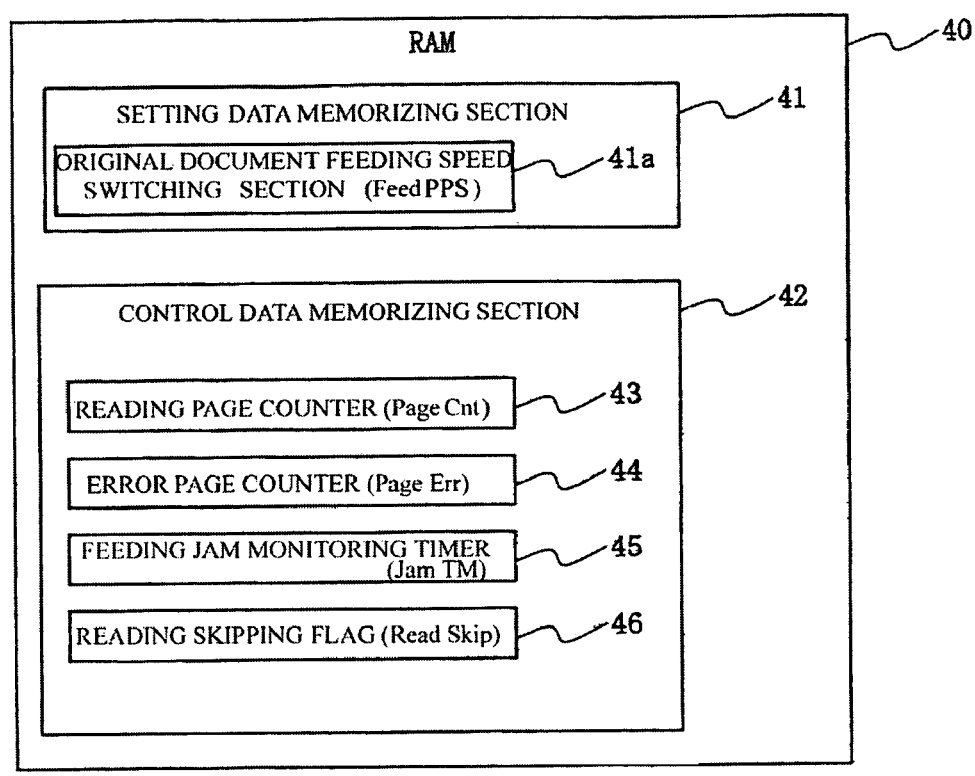
FIG. 11 is a view showing a structure of a RAM according to the second embodiment of this invention.

FIG. 11 is a view showing a structure of a RAM according to the second embodiment of this invention.

In this embodiment, the setting data memorizing section 41 has an original document feeding speed switching section (Feed PPS) 41a serving as a medium feeding speed memorizing section composed of setting modes of "Normal" and "Fast" modes, for switching the original document conveyance speed defined as conveyance speed of the original document at the time of the original document reading skipping operation, i.e., original document feeding conveyance speed defined as rotating speed of the ADF roller 515, as setting data selectable by the operator. The "Normal" mode is defined as a setting in which the original document 512 during the feeding operation for feeding the original document 512 is fed until the discharge sensor 517 detects the rearmost end of the original document 512 loaded on the original document tray 511, at feeding speed slower than discharge speed in the discharge operation for discharging the original document 512 to the discharge tray 521 after the rearmost end of the original document 512 is conveyed through the discharge sensor, and in this mode, the original document 512 is fed at slow speed while discharged at speed faster than the conveyance speed at the time of the reading operation, likewise the conveyance speed described in the first embodiment. The "Fast" mode is defined as a setting in which the original document 512 is fed at feeding speed as the same as the conveyance speed at the time of the original document reading skipping operation described in the first embodiment, and the original document 512 is fed and discharged at the same speed as the conveyance speed at the time of this reading skipping operation.

The control data memorizing section 42 has, likewise the first embodiment, the read page counter 43 for memorizing a page number of the original documents on which the reading operation is completed, the error page counter 44 for memorizing which page of the original documents gets jammed, and the feeding jam monitoring timer 45 for monitoring the original document feeding jam the time of controlling the original document conveyance, and furthermore, the control data memorizing section 42 in this embodiment is furthermore added with a reading skipping flag (Read Skip) 46. The reading skipping flag 46 is defined as a memorizing section for memorizing a flag for making the judgment as to whether a reading skipping conveyance or a reading operation is presently controlled.

Furthermore, the operation panel controller 100 has, as a feeding speed setting means, a program capable of operating the setting of the original document feeding speed switching section 41a.

The reading controller 50 has a program for controlling the feeding conveyance speed of the read device section 51 according to the set content of the original document feeding speed switching section 41a. The other structure is the same as the first embodiment, so that the duplicated explanation is omitted.

Operation of the original document reading apparatus according to this embodiment is described next. The operation for changing the setting data of the original document feeding speed switching section 41a is described first.

Figure 12:
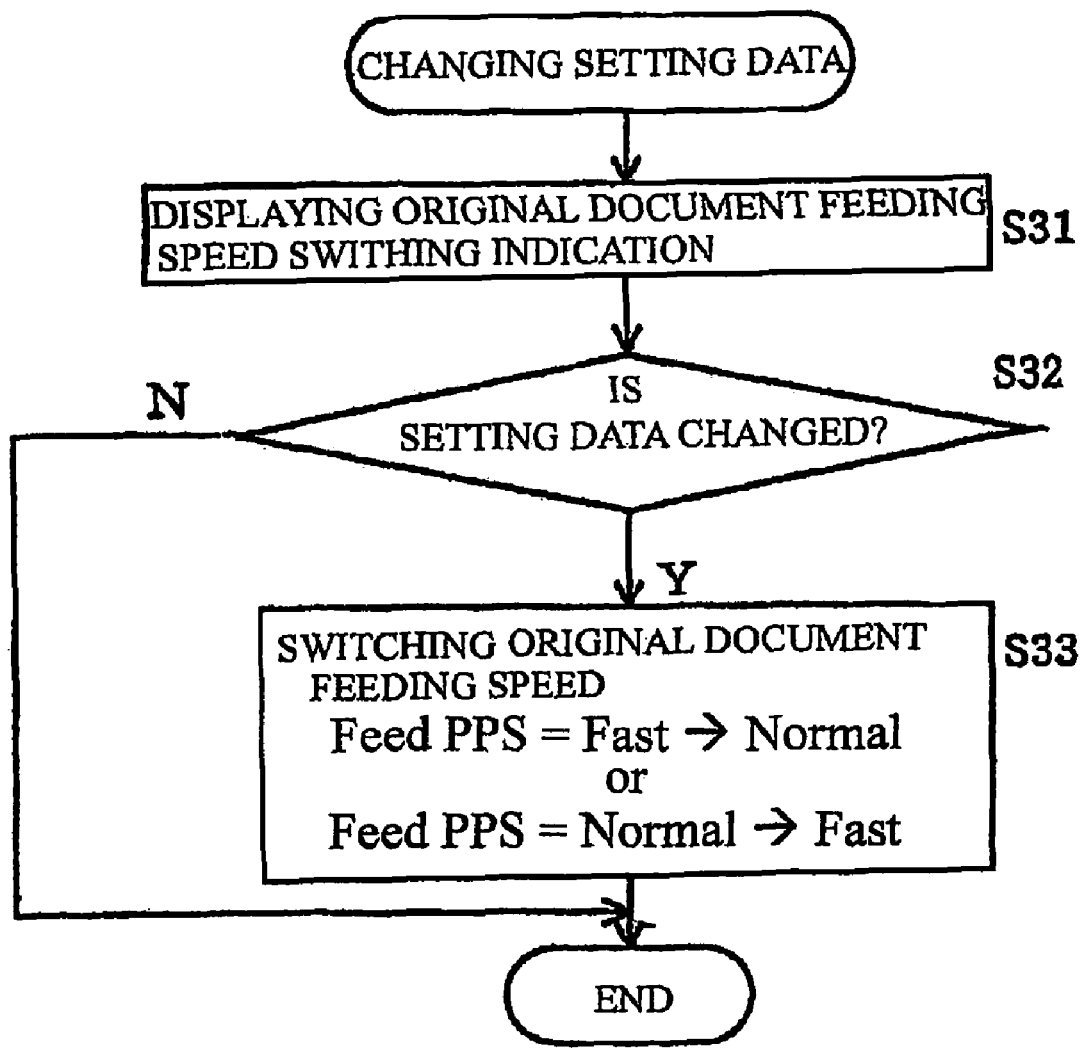
FIG. 12 is a flow chart showing operation of changing setting data of an original document feeding speed switching section according to the second embodiment of this invention.

FIG. 12 is a flow chart showing operation of changing setting data of an original document feeding speed switching section according to the second embodiment of this invention, and FIG. 13 is a first view showing an example of operational guidance displayed on a display device of an operation panel according to the second embodiment of this invention, and FIG. 14 is a second view showing an example of the operational guidance displayed on the display device of the operation panel according to the second embodiment of this invention.

Herein, the processing for changing the "Normal" and "Fast" modes defined as the setting data of the original document feeding conveyance switching section 41a, implemented by the operator, is described.

First, an original document feeding speed switching indication is displayed. In this case, the setting mode stored in the original document feeding speed switching section 41a in the setting data memorizing section 41 is read to display a character string corresponding to the content of the read setting mode, on the display device with the display section 102 of the operation panel controller 100. It is to be noted that where the content of the setting mode indicates the "Fast" mode, the operational guidance such as shown in FIG. 13 is displayed, while where the content of the setting mode indicates the "Normal" mode, the operation guidance such as shown in FIG. 14 is displayed.

The judgment is subsequently made as to whether the setting data is changed. In this case, the key input section 101 of the operation panel controller 100 makes the judgment as to the setting mode changing operation, according to the operator's operation in using the keys of the operation panel. Where the setting value is not changed, this processing is completed. Where the judgment is made that a "Select" key shown in FIG. 13 or FIG. 14 is entered, the original document feeding speed is switched. In this case, the setting mode of the original document feeding speed switching section 41a is defined as the "Normal" mode, the indication on the display device is switched into the "Fast" mode indication, while where the setting mode of the original document feeding speed switching section 41a is defined as the "Fast" mode, the indication on the display device is switched into the "Normal" mode indication, and the setting mode of the original document feeding speed switching section 41a is rewritten upon entering the "Enter" key, thereby completing this processing. In this bout, the timer value for detecting the jam, i.e., the feeding jam, is also switched into the value for the "Normal" mode or the "Fast" mode, and the setting of a monitoring period for judging the feeding jam can be changed in accordance with the feeding speed.

A flow chart is described next. The original document feeding speed switching indication is displayed at the step S31. The judgment is made at the step S32 as to whether the setting data is changed. Where the setting data is changed, the operation goes to the step S33 while where the setting data is not changed, this processing is completed. The original document feeding speed is switched at the step S33. The setting mode of the original document feeding speed switching section 41a is set to the "Normal" mode, the indication on the display device is switched into the "Fast" mode indication while where the setting mode of the original document feeding speed switching section 41a is set to the "Fast" mode, the indication on the display device is switched into the "Normal" mode indication, and this processing is completed.

Operation of the original document conveyance processing is described next.

Figure 15:
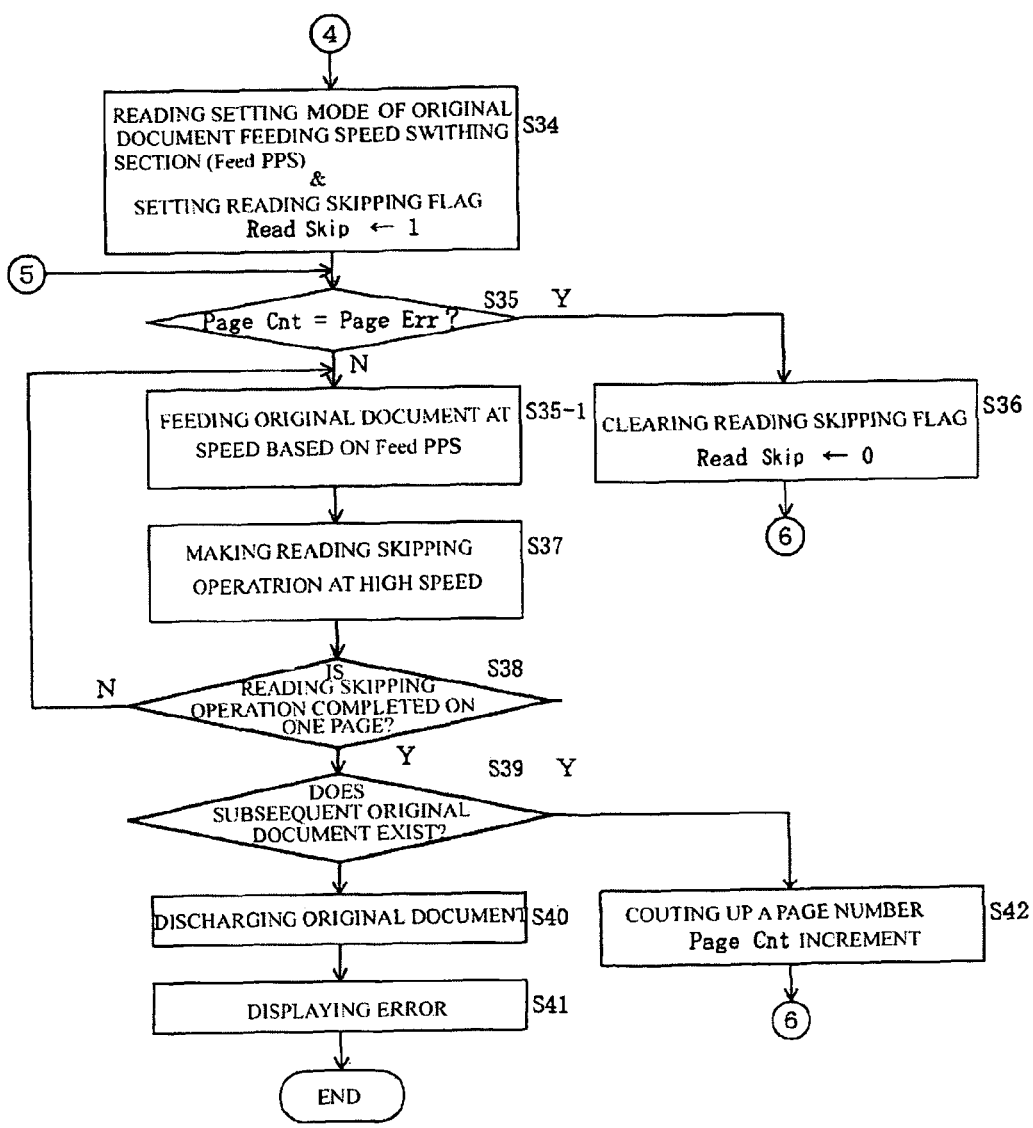
FIG. 15 is a first flow chart showing operation of an original document conveyance processing according to the second embodiment of this invention.
Figure 16:
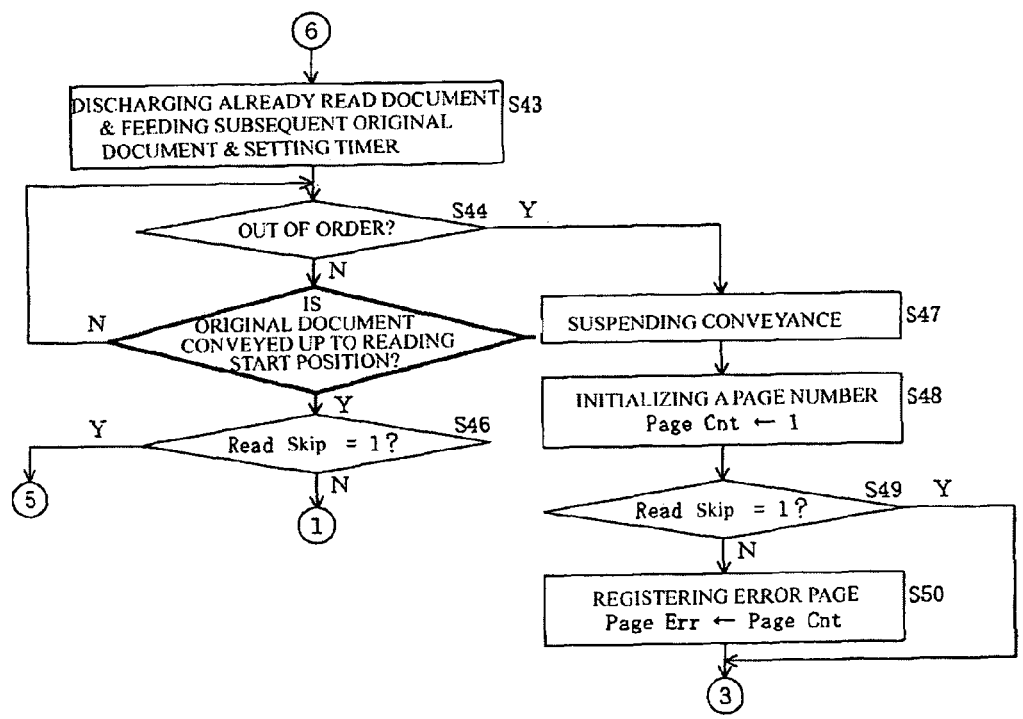
FIG. 16 is a second flow chart showing operation of the original document conveyance processing according to the second embodiment of this invention.

FIG. 15 is a first flow chart showing operation of an original document conveyance processing according to the second embodiment of this invention, and FIG. 16 is a second flow chart showing operation of the original document conveyance processing according to the second embodiment of this invention.

In this case, the original document conveyance is processed upon the setting mode of the original document feeding speed switching section 41a. Herein, as an explanation condition, particularly explained is a characteristic of this embodiment, i.e., the conveyance control of the subsequent original document during the reading skipping operation. The other processing is the same as the first embodiment, so that the duplicated explanation is omitted.

Furthermore, the first embodiment is the same as the original document reading apparatus making a processing on the condition that the setting mode of the original document feeding speed switching section 41a is set statically to the "Fast" mode, while this embodiment is characterized in a point that the setting mode can be switched into each of the "Fast" and "Normal" modes. That is, the processing based on the "Fast" mode is explained in the first embodiment, so that the duplicate explanation for the processing based on the "Fast" mode is omitted herein but the processing on the condition that the setting mode of the original document feeding speed switching section 41a is set to the "Normal" mode is explained. It is to be noted that FIG. 5 is corresponding to FIG. 6 explained in the first embodiment while FIG. 16 is corresponding to FIG. 5 explained in the first embodiment.

First, the setting mode of the original document feeding speed switching section (Feed PPS) is read and the reading skipping flag is set. In this case, the operation shifts from the step S20 as shown in FIG. 5 to read the setting mode stored in the original document feeding speed switching section 41a, and thus the preparation for reading skipping operation is deemed to be completed, thereby setting the reading skipping flag 46 to one. That is, a Read Skip as shown in FIG. 11 is set to one. That is, all the original documents including the original document already read is reloaded by the operator after the suspended in the event of the jam during the reading operation, so that the original document reading apparatus is in the status in which the reading operation is implementable.

The judgment is subsequently made as to whether the Page Cnt is equal to the Page Err. In this case, the page on which the reading operation is suspended due to the jammed original document is judged. That is, where the operator reloads all the original documents including the already read original documents, the reading skipping operation is made until the jammed page is fed, and the judgment is substantially made that the operation is switched into the reading operation subsequent to the jammed page.

Where the judgment is made that the jammed page is fed, that is, the pages to be skipped are over, the reading skipping flag is cleared. In this case, the reading skipping operation is deemed to be completed, thereby resetting the Read Skip to zero, and the already read original documents is discharged while the subsequent original document is fed to convey, as the preparation for the reading operation, the original document up to the reading position.

Furthermore, where the judgment is made that the jammed page is not yet fed, that is, the reading skipping operation is still implementable, the reading skipping operation is made at high speed after the paper is fed at feeding speed based on the Feed PPS. In this case, the original document conveyance is simply made without making the image data reading operation with the closely contact sensor 519. Furthermore, the conveyance for the reading skipping operation is implemented at the maximum conveyance speed of the reading device section 51 without relation to the setting such as, e.g., resolution or density at the time of the reading operation.

The judgment is made as to whether the reading skipping operation is not yet completed to one page. In this case, the rearmost end of the original document 512 is detected being conveyed through the discharge sensor 517, and accordingly the reading skipping operation is continued until making the judgment that the reading skipping operation is completed to one sheet of the original documents 512. Where the judgment is made that the reading skipping operation is completed to one sheet of the original documents 512, the judgment is made as to whether the subsequent original document exists. In this case, the judgment is made with the original document sensor 513 as to whether the subsequent original document exists on the original document tray 511.

Subsequently, where the judgment is made that the subsequent original document does not exist on the original document tray 511, the original document 512 is discharged. In this case, the discharge of the original document 512 is completed upon keeping the first feed roller 516 driven for a certain period.

The error indication is displayed and this processing is completed. In this case, supposedly, subsequent original documents do not run out during the reading skipping operation, so that the error indication such as shown in FIG. 10, is displayed on the display device of the operation panel controller 100, while the image data stored in the image memorizing section 54 by the time that the reading operation is suspended in the event of the jam are all canceled, and this reading job itself is canceled and completed.

Where the judgment is made as to whether the subsequent original document exists, and the judgment is made that the subsequent original document 512 exists on the original document tray 511, the read page number is counted up to increment the read page counter 43. That is, the Page Cnt is incremented.

It is to be noted that the main point of this embodiment is to the conveyance of the fed original document is controlled in the same manner as the regular reading operation, upon conveyance control among the pages during this reading skipping operation.

Subsequently, the already read original document is discharged while the subsequent original document is fed. In this case, the ADF roller 515 as well as the first feed roller 516 are driven, and the original documents are drawn with the original document separator 514, into the conveyance route one sheet by one sheet in order from the topmost original document. At the same time, the operation of discharging the already read original document is implemented in parallel with the operation of conveying the subsequent original document. In this case, the rollers 515, 516 are rotated based on the Feed PPS, and the roller 520 is rotated at high speed.

The judgment is substantially made as to whether the status is in error. In this case, the judgment as to the existence of the feeding jam is made with the feeding jam monitoring timer 45 during the original document feeding operation. Where the judgment is made that the status is not in error, the judgment is further made as to whether the original document 512 is conveyed up to the reading start position. In this case, the presently conveyed original document is detected with the reading position sensor 517 as the discharge sensor, and kept on being conveyed up to a position of the closely contact sensor 519.

The judgment is then made as to whether the Read Skip is equal to one. In this case, the judgment is made with the reading skipping flag 46 as to whether the reading skipping operation is presently made or the reading skipping operation is completed and the reading operation is to be started. Where the judgment is made that the reading skipping operation is presently made, the judgment is further made as to whether the Page Cnt is equal to the Page Err. Where the judgment is made that the reading skipping operation is completed to start the reading operation, the operation shifts to the step S5 shown in FIG. 3.

Furthermore, where the judgment is made as to whether the status is in error, and the judgment of the error status is made, the conveyance is suspended. In this case, the conveyance of the original document 512 is immediately stopped ascribable to the error as the feeding jam.

Subsequently, the page number is initialized. In this case, the read page counter 43 is set to one as an initial value. That is, the Page Cnt is set to one.

The judgment is then made as to whether the Read Skip is equal to one. In this case, the judgment is made with the reading skipping flag 46 as to whether the reading skipping operation is presently made or the reading operation subsequent to the reading skipping operation is presently made. Where the judgment is made that the reading skipping operation is presently made, the operation shifts to the step S16 shown in FIG. 5. Where the judgment is made that the reading operation subsequent to the reading skipping operation is presently made, the error page is registered. In this case, a value in the read page counter 43 is transferred into the error page counter 44 to memorize which page gets jammed. That is, the Page Cnt is transferred into the Page Err. The operation then shifts to the step S16 shown in FIG. 5.

A flow chart is explained next. The setting mode of the original document feeding speed switching section (Feed PPS) is read and the setting of a reading skipping flag is proceeded to set the Read Skip to one at the step S34. The judgment is made at the step S35 as to whether the Page Cnt is equal to the Page Err. Where the Page Cnt is equal to the Page Err, the operation goes to the step S36 while where the Page Cnt is not equal to the Page Err, the operation goes to the step S37. The paper is fed at speed based on the Feed PPS at the step S35-1. The reading skipping flag is cleared to set the Read Skip to zero at the step S36. The reading skipping operation is made at high speed at the step S37. The judgment is made at the step S38 as to whether the reading skipping operation is completed to one page. Where the reading skipping operation is completed to one page, the operation goes to the step S39 while where the reading skipping operation is not yet completed to one page, the operation returns to the step S35-1. The judgment is made at the step S39 as to whether the subsequent original document exists. Where the subsequent original document does not exist, the operation goes to the step S40 while where the subsequent original document exists, the operation goes to the step S42. The original document is discharged at the step S40. The error indication is displayed and this processing is completed at the step S41. The read page number is counted up to increment the Page Cnt at the step S42. The already read original document is discharged and the subsequent original document is fed and the timer is set at the step S43. The judgment as to the error status is made. Where the status is not in error, the operation goes to the step S45 while where the status is in error, the operation goes to the step S47. The judgment is made at the step S45 as to whether the original document is conveyed up to the reading start position. Where the original document is conveyed up to the reading start position, the operation goes to the step S46 while where the original document is not yet conveyed up to the reading start position, the operation returns to the step S44. The judgment is made at the step S46 as to whether the Read Skip is equal to one. Where the Read Skip is equal to one, the operation returns to the step S35 while where the Read Skip is not equal to one, the operation returns to the step S5. The conveyance is suspended at the step S47. The page number is initialized to set the Page Cnt to one at the step S48. The judgment is made at the step S49 as to whether the Read Skip is equal to one. Where the Read Skip is equal to one, the operation returns to the step S16 while the Read Skip is not equal to one, the operation goes to the step S50. The error page is registered and the Page Cnt is transferred into the Page Err at the step S50.

In the above described first embodiment, since the original document of one sheet is fed and discharged at high speed during the reading skipping operation until when the jammed page is fed, period required for a sequence of reading skipping operation can be shortened, however, there is concern that the page which could be fed without any problem during the reading operation, is suspended from being read in the event of jam newly caused during the reading skipping operation since the discharge operation during the reading skipping operation is made at high speed differently from that during the reading operation.

In this embodiment, correspondingly, the original document 512 is conveyed at slow speed until conveyed up to the reading start position, and then the speed is switched from slow into fast so the reading skipping operation can be made at high speed after the rearmost end of the original document 512 is conveyed through the discharge sensor 517. Therefore, it becomes possible to reduce occurrence rate of the jam during the reading skipping operation. Furthermore, each of the feeding conveyance controls in the first and second embodiment can be, if needed, switched with a setting operation by the operator.

It is to be noted that the feeding conveyance control can be automatically switched into that according to this embodiment independently from the setting operation by the operator in a case where the jam occurs again during the reading skipping operation.

The operator can therefore reduce his operation burden and time loss due to the jam recurrence.

The third embodiment is explained next. It is to be noted that members structured the same as the first and second embodiments are assigned with the same numerals to omit the duplicated explanation. The duplicated explanation for the same operation and effects as the first and second embodiments is also omitted.

Figure 17:
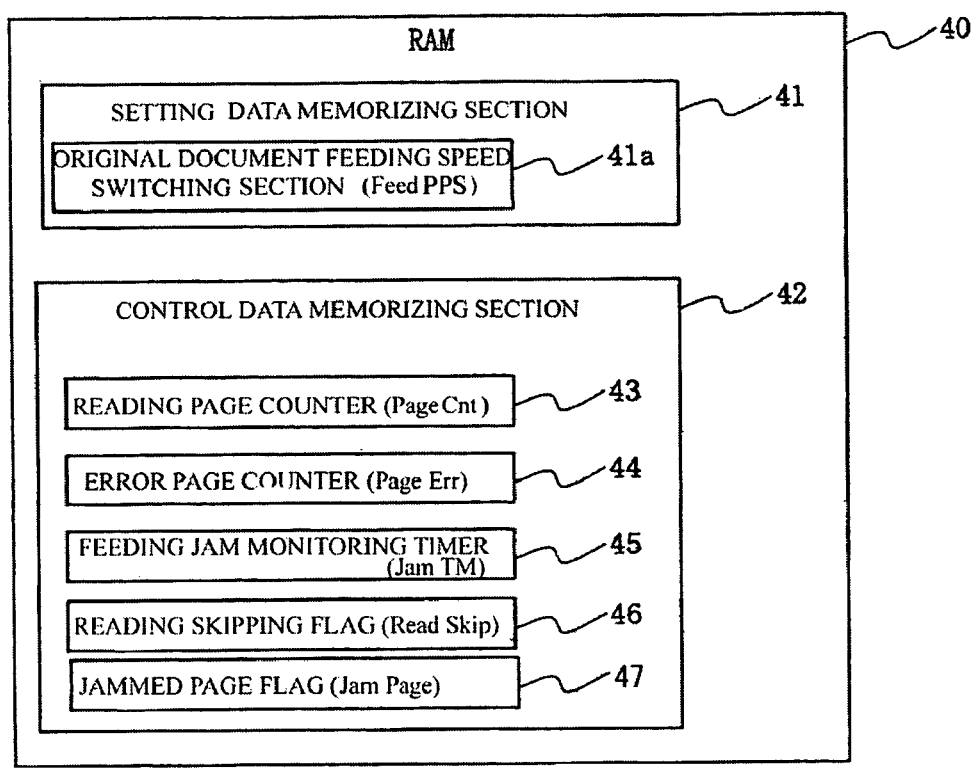
FIG. 17 is a view showing a structure of a RAM according to the third embodiment of this invention.

FIG. 17 is a view showing a structure of a RAM according to the third embodiment of this invention.

In this embodiment, the control data memorizing section 42 has, likewise the second embodiment, the read page counter 43, the error page counter 44, the feeding jam monitoring timer 45, and the reading skipping flag 46, and further, the control data memorizing section 42 in this embodiment is added with a jammed page flag (Jam Page) 47. The jammed page flag is defined as a memorizing section for memorizing a flag indicating the status the jammed page is fed during the reading skipping operation.

The feeding jam monitoring timer 45 is different from that in the first embodiment in terms of structured to change a controlled timer value, according to the jammed page flag 47 indicating the status that the jammed page is fed. That is, a timer value of the jam monitoring timer at the time that the page on which the reading operation is suspended in the event of the jam is conveyed after the reading skipping operation, is set to smaller than that at the time that the original documents subsequent to the jammed page on which the reading operation is suspended are conveyed during the reading operation.

Furthermore, the reading controller 50 has a program for jam monitoring control at the time of conveyance of the fed original document with the reading device section 51, based on the setting value of the feeding jam monitoring timer 45.

It is to be noted that the original document feeding speed switching section 41a in the setting data memorizing section 41 as well as the reading skipping flag 46 in the control data memorizing section 42 both described in the second embodiment can be applicable in this embodiment, thereby composing this embodiment without eliminated. The other structure is the same as the first embodiment, so the duplicated explanation is omitted.

Operation of the original document reading apparatus according to this embodiment is described. The reading skipping operation ascribable to the operator's reloading of all the original documents including the already read original documents, is described first.

Figure 18:
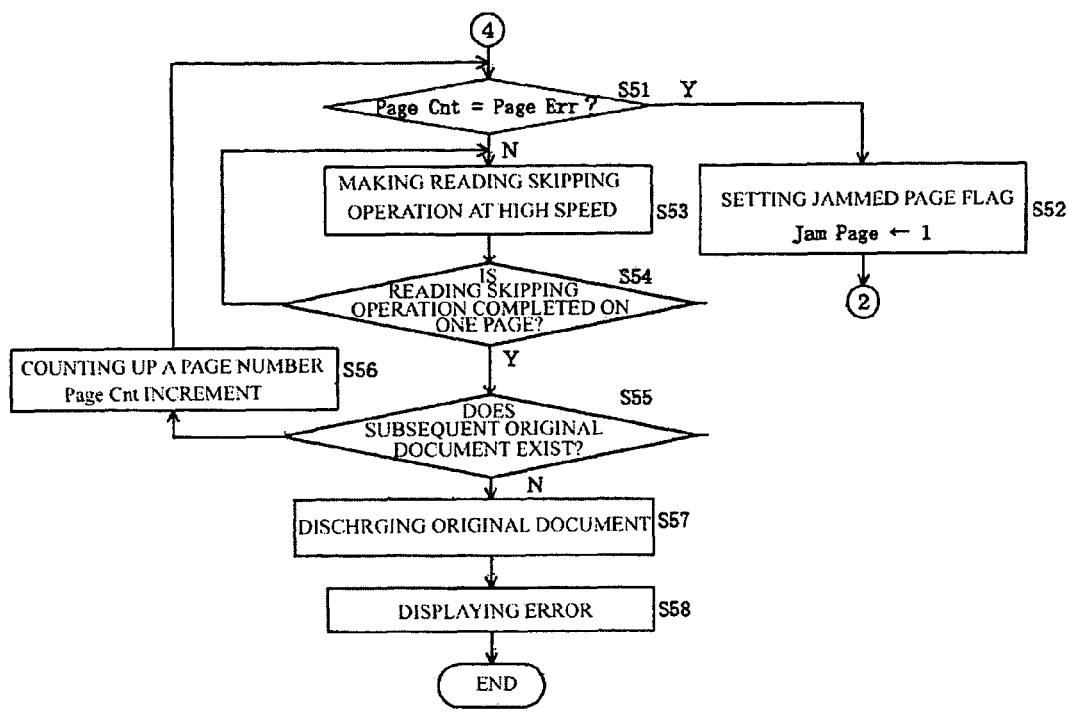
FIG. 18 is a flow chart showing operation of a reading skipping processing ascribable to reloading total original documents including already read original documents by an operator, according to the third embodiment of this invention.

FIG. 18 is a flow chart showing operation of a reading skipping processing ascribable to reloading total original documents including already read original documents by an operator, according to the third embodiment of this invention.

It is to be noted that FIG. 18 is substantially the same as FIG. 6 described in the first embodiment, and the processing specific to this embodiment is limited to a jammed page flag setting processing.

The judgment is first made as to whether the Page Cnt is equal to the Page Err. In this case, the judgment is made at to the page on which the reading operation is suspended in the event of the jam. That is, the operator reloads all the original documents including the already read original document, so that the reading skipping operation is made until the jammed page is fed and the operation is switched into the reading operation subsequent to the jammed page. Where the judgment is made that the jammed page is fed, that is, the pages to be skipped are all over, the setting of the jammed page flag is processed. In this case, one is set to the jammed page flag 47, i.e., the Jam page is set to one, in order to indicate the status where the jammed page is fed, and the original document is, as preparation for the reading operation, conveyed up to the reading position, so that the operation shifts to the step S10 shown in FIG. 4.

Furthermore, where the judgment is made that the jammed page is not yet fed, that is, the skipping reading operation is still implementable, the reading skipping operation is made at high speed.

It is to be noted that the subsequent operation is the same as that from the step S22 to the step S27 shown in FIG. 6 explained in the first embodiment, so that the duplicated explanation is omitted.

The operation of the jam monitoring processing at the time that the jammed paper is fed up to the reading position after the reading skipping operation is explained next.

Figure 19:
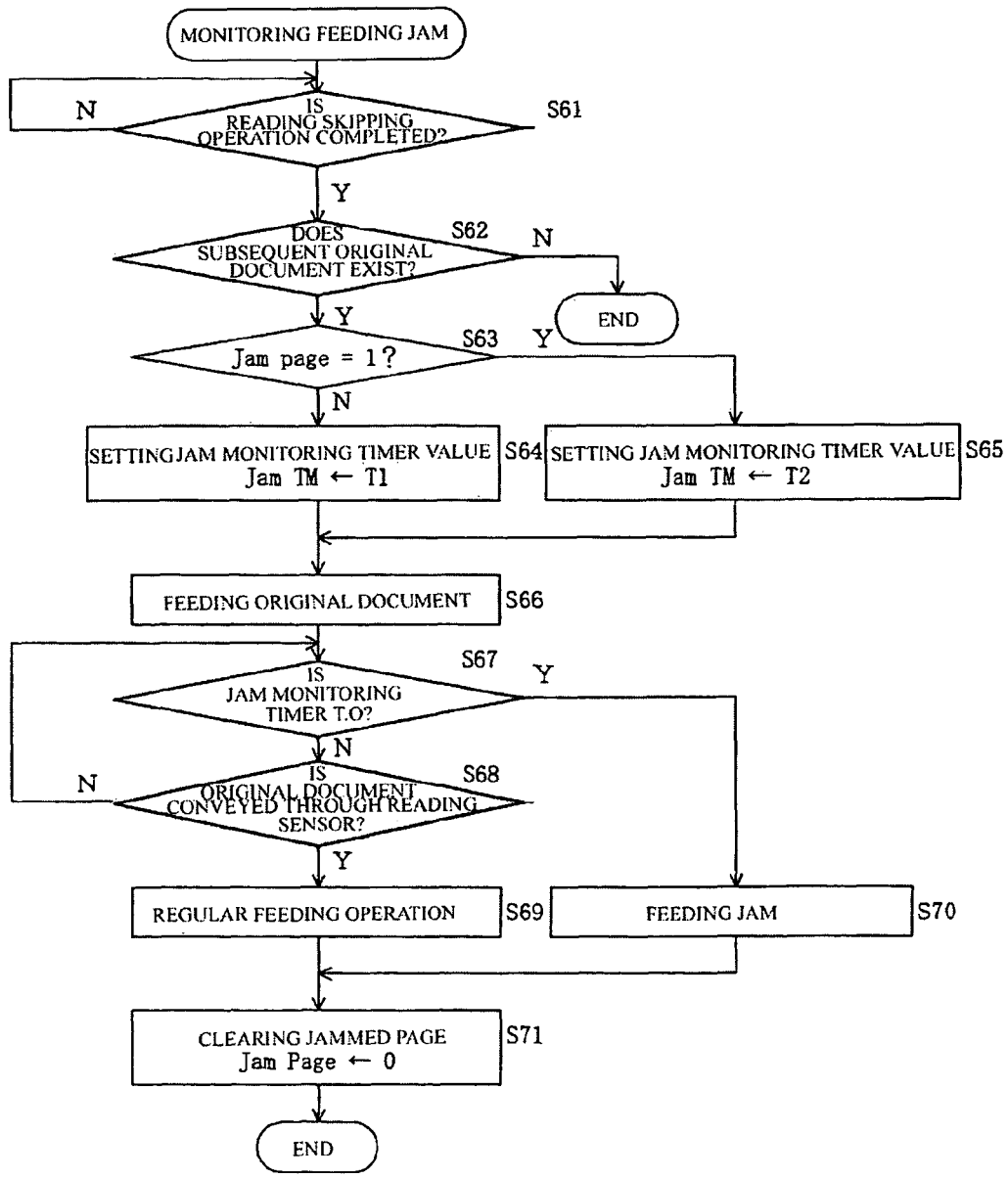
FIG. 19 is a flow chart showing operation of a jam monitoring processing at the time of feeding a jammed original document up to a reading position after completion of the reading skipping operation according to the third embodiment of this invention.

FIG. 19 is a flow chart showing operation of a jam monitoring processing at the time of feeding a jammed original document up to a reading position after completion of the reading skipping operation according to the third embodiment of this invention.

It is to be noted that the operation explained herein is the concrete operation for judging the feeding jam error, at the step S11, shown in FIG. 4, explained in the first embodiment.

The judgment is first made as to whether the reading skipping operation is completed. In this case, when detecting the status where the rearmost end of the last original document 512 to be skipped is conveyed through the discharge sensor 517, the reading skipping operation is thus continued until the judgment is made that the reading skipping operation is completed to the original document of one sheet.

The judgment is subsequently made as to whether the subsequent original document exists. In this case, where the judgment is made that reading skipping operation is completed to one page, the judgment is further made with the original document sensor 513 as to whether the subsequent original document exists on the original document tray 511. Where the subsequent original document exists on the original document tray 511, the judgment is made as to whether the Jam Page is equal to one. In this case, a judgment is made to set different value to a timer value for monitoring the jam, depending on the content of the jammed page flag 47. Herein, where the jammed page flag 47 is equal to zero, that is, where the original documents other than the page on which the reading operation is suspended in the event of the jam are conveyed, a timer value, T1, for monitoring the jam is set to the feeding jam monitoring timer 45. That is, the Jam TM is set to T1. Where the Jam Page is equal to one, a value of the jam monitoring timer is set. Herein, where the jammed page flag 47 is set to one, that is, where conveying the page on which the reading operation is suspended in the event of the jam, a timer value, T2, for monitoring the jam is set to the feeding jam monitoring timer 45. That is, the Jam TM is set to T2.

This timer is for monitoring a period from when the reading position sensor 517 as the discharge sensor is changed from on to off, that is, the rearmost end of the original document is conveyed and discharged, to when the reading position sensor 517 is changed from off to on again since the subsequent document on the original document sensor 513 is conveyed up to the reading position sensor 517, that is, the front end of the subsequent document is conveyed and fed.

It is to be noted that timer value T1 is calculated based on, e.g., a conveyance distance from the original document sensor 513 to the reading sensor 517, original document conveyance speed, and the volume that the original document is slipped at the time of conveyance, and furthermore is defined as a value calculated in consideration of a margin of sufficient volume. On the other hand, the timer value T2 is calculated in the condition that a value of the sufficient margin volume on calculating the timer value T1 is defined as the minimum value of the margin volume. That is, this embodiment is characterized in that a feeding period, i.e., a jam monitoring period, can be shortened with respect to the original document once jammed is fed.

The original document is subsequently fed. In this case, the ADF roller 515 as well as the first feed roller 516 are driven, and the original documents are drawn with the original document separator 514 into the conveyance route one sheet by one sheet in order from the topmost original document.

Subsequently, the judgment is made as to whether the jam monitoring timer indicates a time out status (T. O.) In this case, monitoring operation is made for a time indicated with the timer value T1 or T2 set to the feeding jam monitoring timer 45. Where the feeding jam monitoring timer 45 does not indicate a time out status, the judgment is further made as to whether the subsequent original document is conveyed through the reading sensor. In this case, the reading sensor 517 is detected changing from off to on, thereby making the judgment as to whether the front end of the subsequent original document is conveyed through the reading sensor 517. Where the subsequent original document is not yet conveyed through the reading sensor 517, the original document is fed to be conveyed within time determined with the jam monitoring timer.

Furthermore, where the subsequent original document is detected being conveyed through the reading sensor 517 within the determined time, the feeding operation is deemed to be completed normally and the status is in the normal feeding operation.

On the other hand, where the feeding jam monitoring timer 45 indicates a time out status and the subsequent original document is not conveyed through the reading sensor 517 in the determined time, the feeding operation is deemed not to be made and the status is in the feeding jam error. The jammed page flag is then cleared. In this case, the feeding operation to the jammed original document is deemed to be completed, and the jammed page flag 47 is set to zero, that is, the Jam Page is set to zero, thereby completing this processing.

The normal feeding operation status or the feeding jam result is thus reported as the result of the operation at the step S11 shown in FIG. 4.

A flow chart shown in FIG. 18 is explained next. The judgment is made at the step S51 as to whether the Page Cnt is equal to the Page Err. Where the Page Cnt is equal to the Page Err, the operation goes to the step S52 while where the Page Cnt is not equal to the Page Err, the operation goes to the step S53. The setting of the jammed flag is proceeded to set the Jam Page to one at the step S52. The reading skipping operation is made at high speed at the step S53. The judgment is made at the step S54 as to whether the reading skipping operation is completed to one page. Where the reading skipping operation is completed to one page, the operation goes to the step S55 while where the reading skipping operation is not yet completed to one page, the operation returns to the step S53. The jam monitoring operation may be made herein also.

The judgment is made at the step S55 as to whether the subsequent original document exists. Where the subsequent original document exists, the operation goes to the step S56 while where the subsequent original document does not exist, the operation goes to the step S57. The page number is counted up to increment the Page Cnt at the step S56. The original document is discharged at the step S57. The error indication is displayed to complete this processing at the step S58.

A flow chart shown in FIG. 19 is explained next. The judgment is made at the step S61 as to whether the reading skipping operation is completed. Where the reading skipping operation is completed, the operation goes to the step S62 while where the reading skipping operation is not yet completed, the operation is on standby. The judgment is made at the step S62 as to whether the subsequent original document exists. Where the subsequent original document exists, the operation goes to the step S63 while where the subsequent original document does not exist, this processing is completed. The judgment is made at the step S63 as to whether the Jam Page is equal to one. Where the Jam Page is not equal to one, the operation goes to the step S64 while where the Jam Page is equal to one, the operation goes to the step S65. A value of the jam monitoring timer is set at the step S64. That is, the Jam TM is set to T1. A value of the jam monitoring timer is set at the step S65. That is, the Jam TM is set to T2. The original document is fed at the step S66. The judgment is made at the step S67 as to whether the jam monitoring timer indicates T. O. Where the jam monitoring timer does not indicate T. O., the operation goes to the step S68 while where the jam monitoring timer indicates T. O., the operation goes to the step S70. The judgment is made at the step S68 as to whether the subsequent original document is conveyed through the reading sensor. Where the subsequent original document is conveyed though the reading sensor, the operation goes to the step S69 while where the subsequent original document is not yet conveyed through the reading sensor, the operation returns to the step S67. The status is in the normal feeding operation at the step S69. The status is in the feeding jam error at the step S70. The jammed page flag is cleared to set the Jam Page to zero and this processing is completed at the step S71.

When resuming the reading operation suspended in the event of the jam on the original document, there is concern that the original document on which the reading operation is suspended in the event of the jam is in a condition where the jam easily occurs. Especially where the original document itself gets damaged due to the first jam, there is a high possibility that the damaged original document gets more damaged ascribable to the second original document feeding operation. There is no doubt that the original document is to be prevented from damaged as much as possible.

Therefore, according to this embodiment, a jam monitoring period required for judging the jam is shortened only when feeding the jammed original document, compared with that during the regular feeding operation. The jam is therefore detected early so that the original document does not get damaged seriously due to the unprepared feeding operation.

It is to be noted that the setting of the regular jam monitoring period is calculated based on, e.g., a conveyance distance on the machinery, original document conveyance speed, the volume that the original document is slipped at the time of conveyance, or the like, and is further set to the timer value T1 calculated in consideration of a margin of sufficient volume. Furthermore, in this embodiment, calculation is made on the condition that a value of the above margin volume is defined as the minimum value, however, it is also possible to previously hold the original document slipping amount as data for each kind of the media, depending on a property of the original document medium to be conveyed, and the slipping amount may be calculated upon selecting a type of the medium at the time of conveyance.

It is to be noted that this invention is not limited to the above described embodiments, but can be variously modified based on the purpose of this invention, and these modifications are not excluded from the scope of this invention.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but be defined by the claims set forth below.

What is claimed is:

1. An original document reading apparatus having a controller for conveying an original document from a medium loading section for loading said original document via an information reading section for reading information on said original document to a discharged medium stacking section on which said original document is stacked, and for controlling reading operation of said information on said original document, comprising:

an apparatus information reporting section for reporting apparatus information;

a reading start detecting section for detecting an original document reading start instruction when said original document is read; and a conveyance sheet number counting section for counting a sheet number of said original documents conveyed to said information reading section, wherein said controller instructs said apparatus information reporting section, when resuming said reading operation of said information on said original document after suspending said reading operation on an irregular occasion, to make a report of loading on said medium loading section said original documents, said original documents having been loaded after suspending said reading operation, including already read original documents on which said information has already been read prior to suspension of said reading operation as well as unread original documents on which said information has not been read prior to suspension of said reading operation, wherein said controller subsequently controls conveyance of said original documents when said reading start detecting section detects said original document reading start instruction, in such a manner as to set a conveyance speed of said already read original documents to be faster than a conveyance speed of said unread original documents, based on the sheet number of said original documents counted with the conveyance sheet number counting section until the suspension of said reading operation, wherein said conveyance sheet number counting section counts a sheet number of said already read original documents with said information reading section, wherein said controller controls reading skipping operation of said information on each said already read original document based on the sheet number of said already read original documents, and wherein said controller controls said reading skipping operation of said information on said original document as well as controls, when a page on which said reading operation is suspended is fed, a monitoring period for judging said feeding jam on said page of said original documents to be shorter than said monitoring period for judging said feeding jam on regular pages of said original documents.

2. The original document reading apparatus according to claim 1, wherein a jam monitoring period for detecting said feeding jam on said page on which said reading operation is suspended is set to be shorter than a jam monitoring period for detecting said feeding jam on said documents other than said page.

3. The original document reading apparatus according to claim 1, wherein said apparatus information reporting section makes a report of said reading skipping operation while said reading skipping operation is made to said already read original documents.

4. The original document reading apparatus according to claim 1, and further comprising a medium discharge detecting section positioned between said medium loading section and said information reading section on a conveyance route on which said original document is conveyed, wherein said controller can change feeding speed when performing said reading skipping operation of said information on each said already read original document, where said feeding speed is defined as a speed at a time that each said original document is conveyed until that said medium discharge detecting section detects a rearmost end of said original document loaded on said medium loading section.

5. The original document reading apparatus according to claim 4, wherein said controller controls a speed to set said feeding speed to slower than a discharging speed when performing reading skipping operation of said information on said already read original document, where said discharging speed is defined as speed at a time that said original document is conveyed up to said discharged medium stacking section after said rearmost end of said original document is conveyed through said medium discharge detecting section.

6. The original document reading apparatus according to claim 4, wherein said controller controls a setting of a monitoring period required for judging a feeding jam corresponding to said feeding speed.

7. The original document reading apparatus according to claim 4, further comprising a medium feeding speed memorizing section for memorizing speed set with a feeding speed setting section for setting said feeding speed, wherein said controller controls said feeding speed of said original document in accordance with said setting in said medium feeding speed memorizing section when performing said reading skipping operation of said information on said already read original document.

8. The original document reading apparatus according to claim 7, wherein said feeding speed setting section can set a first speed the same as the conveyance speed at the time of said reading skipping operation and a second speed the same as the conveyance speed at the time of said reading operation of said information on said original document.

9. The original document reading apparatus according to claim 4, wherein said controller controls said feeding speed to be slowed down automatically where original document jamming is detected multiple times during said reading skipping operation.

10. The original document reading apparatus according to claim 1, wherein said reading start detecting section detects said original document reading start instruction when a medium detecting section for detecting a status where a medium is loaded on said medium loading section detects said original document to be read.

11. The original document reading apparatus according to claim 1, wherein said reading start detecting section detects said original document reading start instruction entered with a predetermined switch.

12. The original document reading apparatus according to claim 1, wherein conveyance speed of said original document is, subsequent to a page on which said reading operation is suspended, set back to conveyance speed at the time of reading said information on said original document.

* * * * *